(12) United States Patent
Bosy

(10) Patent No.: US 6,394,300 B1
(45) Date of Patent: May 28, 2002

(54) LOCK FOR COMPARTMENT COVER

(76) Inventor: Daniel F. Bosy, 24 Rogate Pl., Scarborough Ontario (CA), M1M 3C3

(*) Notice: Subject to any disclaimer, the term of this patent is extended or adjusted under 35 U.S.C. 154(b) by 0 days.

(21) Appl. No.: 09/551,214

(22) Filed: Apr. 17, 2000

(51) Int. Cl.[7] .............................................. B65D 45/16
(52) U.S. Cl. ...................... 220/326; 220/242; 292/128; 292/102; 292/106; 292/107; 292/203; 292/DIG. 11; 429/97
(58) Field of Search ................................ 220/326, 324, 220/3.8, 242; 292/114, 128, 101, 102, 103, 106, 107, 228, 202, 203, 204, 207, DIG. 11; 429/96, 97, 100

(56) References Cited

U.S. PATENT DOCUMENTS

| | | | | |
|---|---|---|---|---|
| 4,641,370 A | * | 2/1987 | Oyamada | 455/348 |
| 4,880,712 A | * | 11/1989 | Gordecki | 429/97 |
| 4,972,508 A | * | 11/1990 | King | 455/90 |
| 5,206,098 A | * | 4/1993 | Cho et al. | 429/96 |
| 5,372,395 A | * | 12/1994 | Yang | 292/147 |
| 5,634,675 A | * | 6/1997 | Mo | 292/80 |
| 5,638,839 A | * | 6/1997 | Montoli | 132/295 |
| 5,645,954 A | * | 7/1997 | Tamaru | 429/100 |
| 5,722,705 A | * | 3/1998 | Deguchi | 292/87 |
| 5,882,816 A | * | 3/1999 | Gotou | 429/100 |

* cited by examiner

Primary Examiner—Christopher P. Schwartz
Assistant Examiner—Devon Kramer

(57) ABSTRACT

A lock for locking the cover of a compartment to prevent opening of the cover is described. The cover is provided with a biased latch at one end which is movable between a latch position for latching against a mating locking lip of the compartment and a release position to allow the cover to be removed from the compartment. The lock comprises a means for insertion into the biased latch once the cover has been attached to the compartment to prevent the biased latch from moving to the release position.

5 Claims, 3 Drawing Sheets

LOCK FOR COMPARTMENT COVER

FIELD OF THE INVENTION

The present invention relates to a lock for covers of compartments to prevent the opening of the cover. In a preferred embodiment, the present invention relates to a lock for compartments of hand-held electronic devices to prevent the easy removal of the batteries.

BACKGROUND OF THE INVENTION

Releasably closeable compartments are utilized in a number of hand-held electrical or electronic devices. For example, most hand-held electronic devices which are battery-operated have a battery compartment which is releasably closeable by a cover. Such a cover generally is provided with tabs at one edge for insertion into mating holes in the edge of the compartment and a biased latch at the opposite edge of the cover for latching against a mating part of the battery compartment. Such compartments are easily opened by merely releasing the latch and lifting the cover away from the compartment. In most circumstances, where the electronic device is owned and operated by a single user, it is desirable for the cover to be easily removed from the compartment. However, in circumstances where the electronic devices are utilized by a plurality of users, such as in a school or other institution or commercial setting, it is desirable to ensure that the cover may not easily be removed so that the contents of the compartment may not be tampered with. This would be of particular benefit in a school setting where many students would be using the same electronic device, such as a calculator. In these circumstances, it would be of benefit if the teacher were able to ensure that the students did not have easy access to the battery compartment. This would also be of benefit where the compartment may contain memory cards or program cards or other such devices which are critical for the operation of the electronic device.

SUMMARY OF THE INVENTION

The present invention is directed to a lock for locking the cover of a compartment to prevent opening of the cover. The cover is provided with a biased Latch at one end which is movable between a latch position for latching against a mating locking lip of the compartment and a release position to allow the cover to be removed from the compartment. The lock comprises a means for insertion into the biased latch once the cover has been attached to the compartment to prevent the biased latch from moving to the release position.

BRIEF DESCRIPTION OF THE DRAWINGS

A preferred embodiment of a lock of the present invention is illustrated in the attached drawings in which.

DETAILED DESCRIPTION OF A PREFERRED EMBODIMENT

Figure 1:
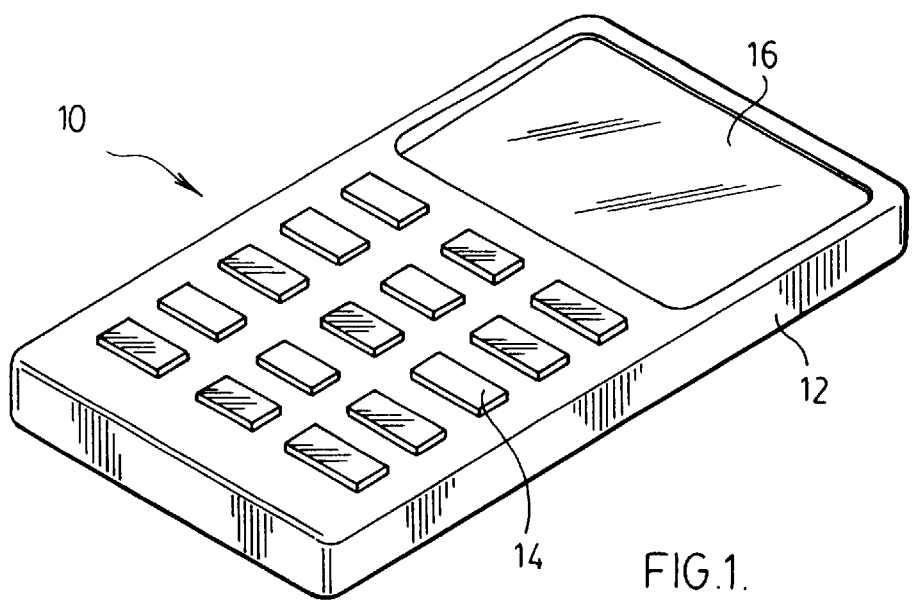
FIG. 1 is a top perspective view of a hand-held calculator.
Figure 2:
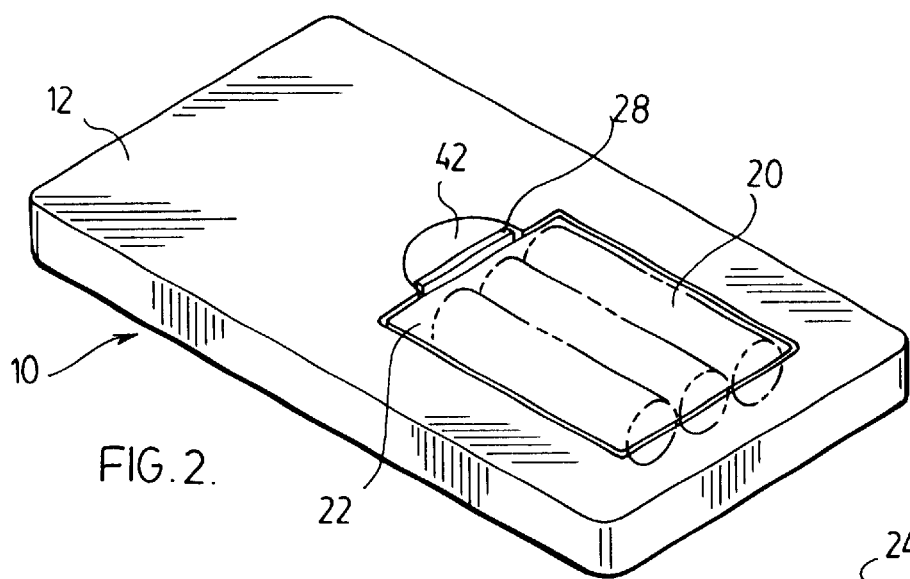
FIG. 2 is a bottom perspective view of the hand-held calculator of FIG. 1 illustrated the battery compartment.
Figure 3:
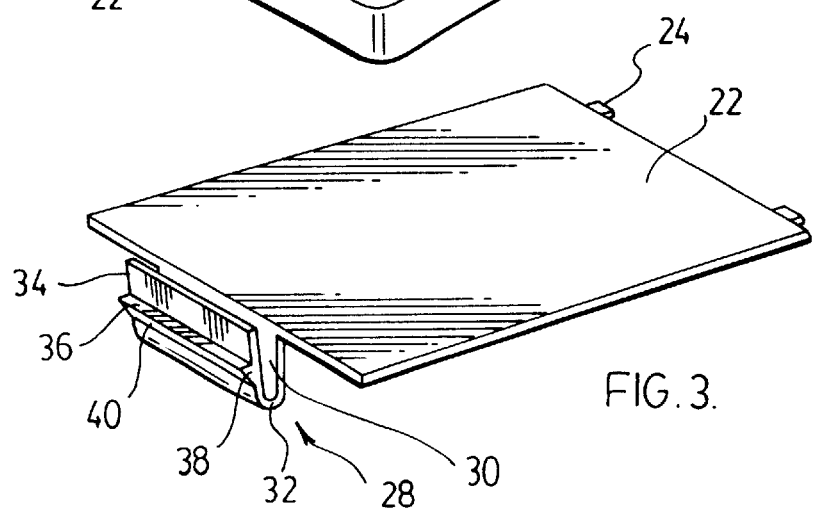
FIG. 3 is a perspective view of the cover for the battery compartment of the hand-held calculator of FIG. 1.
Figure 4:
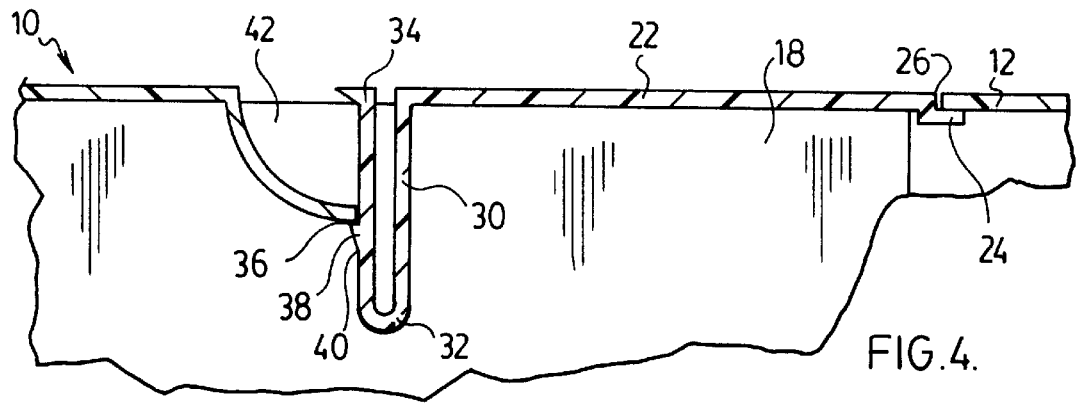
FIG. 4 is a side elevation view in cross-section illustrating the biased latch of the cover in the latched position.

A typical hand-held electronic device, namely a calculator 10, is illustrated in perspective view in FIGS. 1 and 2. Calculator 10 has a case 12 typically constructed of a plastic material. On the front of the case 12 a plurality of keys 14 are provided for entry of data into the calculator 10. A display screen 16 is also provided for display of the data entered into the calculator 10 as well as the results of the calculations carried out by the calculator 10 in response to the keystroke entries on the keys 14. Display screen 16 may be either a LED device for displaying a number of alphanumeric characters in one more lines or may be an LCD device for displaying alphanumeric characters. The LCD device may also be capable of displaying graphical representations of the data or results of the calculations.

Typically, calculators 10 and other hand-held electronic devices are provided with 18 for holding one or more batteries providing power to the calculator 10. Battery compartment 18 is typically provided with a cover 22 which can be latched to the battery compartment 18 to hold the batteries 20 within the battery compartment 18. The cover 22 may be unlatched and removed for changing of the batteries 20. The cover 22 along one edge is generally provided with tabs 24 which mate with just under the lip of the battery compartment 18. The edge of the cover 22 opposite the tabs 24 is provided with a biased latch means 28. Biased latch means 28 is generally U-shaped or U-shaped with a first leg 30 extending downwardly from the edge of the cover 22 to the bight 32 and then the free leg 34 extends upwardly to form the U-shape. The free leg 34 of the biased latch means 28 is provided with a latching surface 36 on the upper edge of a step 38 extending along the length of the free leg 34 on its outside surface. Step 38 is provided with an outwardly and upwardly canted camming surface 40 extending from the free leg 34 to the latching surface 36. Due to the bias or flexing capability of the bight 32, the free leg 34 is movable toward and away from the first leg 30 between the release position and latch position of the biased latch means 28. The edge of the battery compartment 18 is provided with a fingertip receiving recess 42 to enable the user to insert their fingertip into the recess 42 and push the free leg 34 of the biased latch means 28 toward the first leg 30 to release the biased latch means 28 and enable the cover 22 to be removed.

When the cover 22 is installed in the opening of the battery compartment 18 the tabs 24 on the edge of the cover 22 pass through the openings 26 in the battery compartment 18 and engage the under surface of the case 12 of the calculator 10. Once the tabs 24 are inserted into the openings 26, the cover 22 pushed downwardly, pivoting against the interaction between the tabs 24 and the underside of the battery case 12. As the U-shaped biased latch means 28 is pushed down into the battery compartment 18, the bight 32 passes the edge of the recess 42 and the lower end of the free leg 34 rides along the edge of the recess 42. When the camming surface 40 reaches the edge of the recess 42, the edge of the recess 42 rides along the camming surface 40 pushing the free leg 34 toward the first leg 30 against the biasing of the bight 32. Once the camming surface 40 passes the edge of the recess 42, the free leg 34 springs back and the latching surface 36 engages the under surface of the recess 42 at the edge of the battery compartment 18 opposite the openings 26. The engagement of the tabs 24 with the underside surface of the case 12 and the latching surface 36 with the under surface of the recess 42 securely hold the cover 22 in place closing off the battery compartment 18 to maintain the batteries 20 in the compartment 18.

Figure 5:
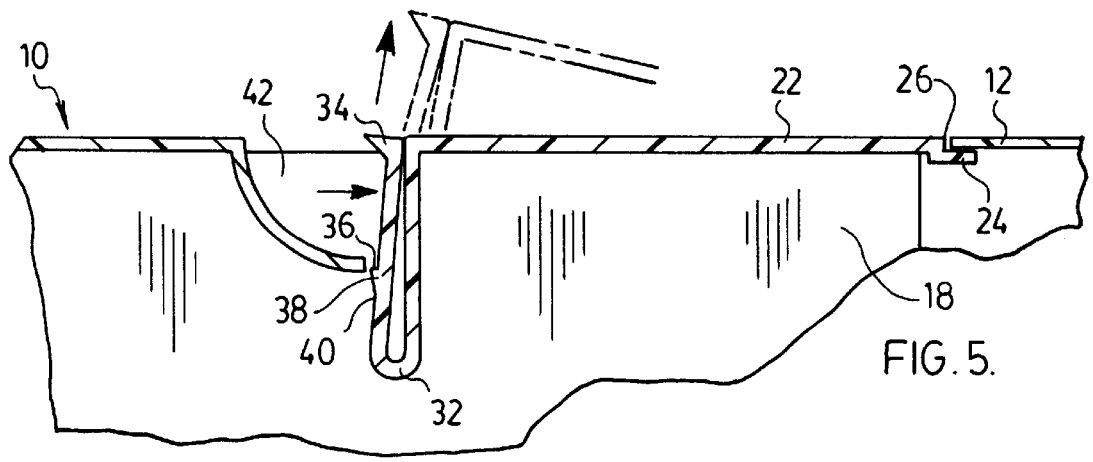
FIG. 5 is a side elevation view in cross-section illustrating the biased latch in the release position and the cover in the process of being removed.
Figure 6:
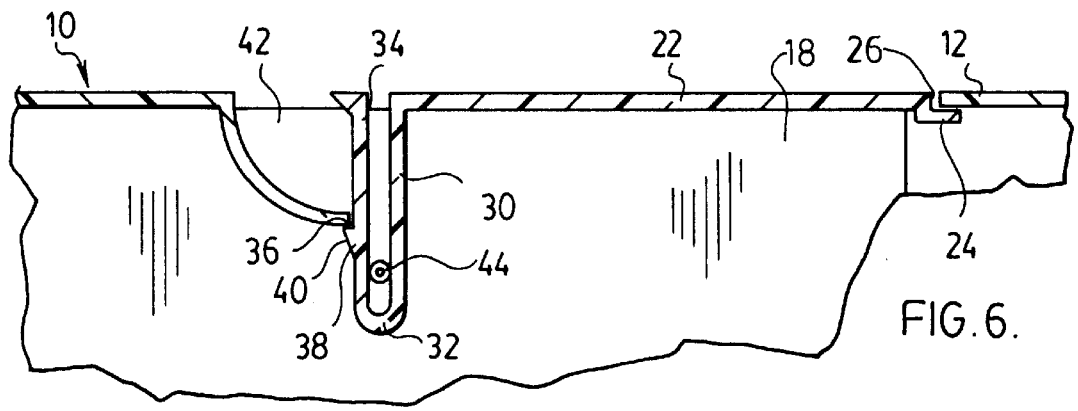
FIG. 6 is a side elevation view illustrating the biased latch of the cover in the latched position with the lock of the present invention inserted therein.
Figure 7:
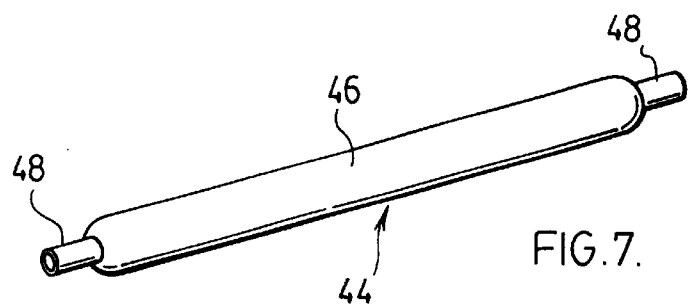
FIG. 7 is a perspective view of a preferred embodiment of a lock according to present invention.
Figure 8:
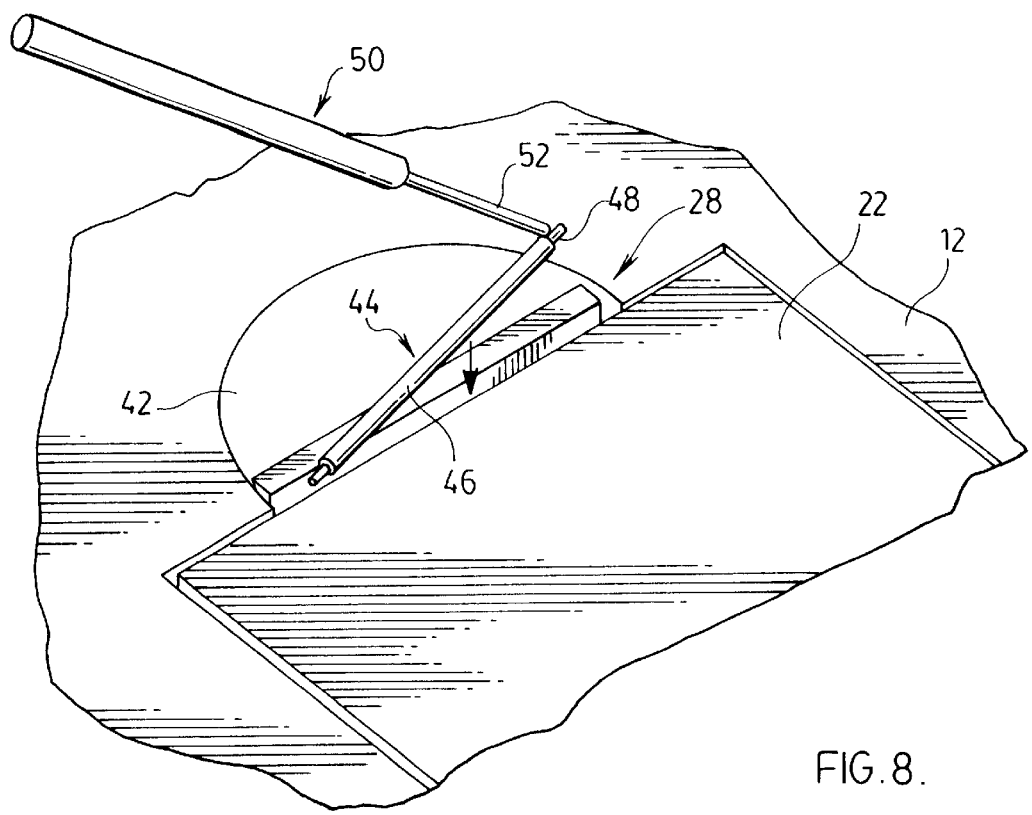
FIG. 8 is a perspective view illustrating in the lock of the present invention being inserted into the biased latch.
Figure 9:
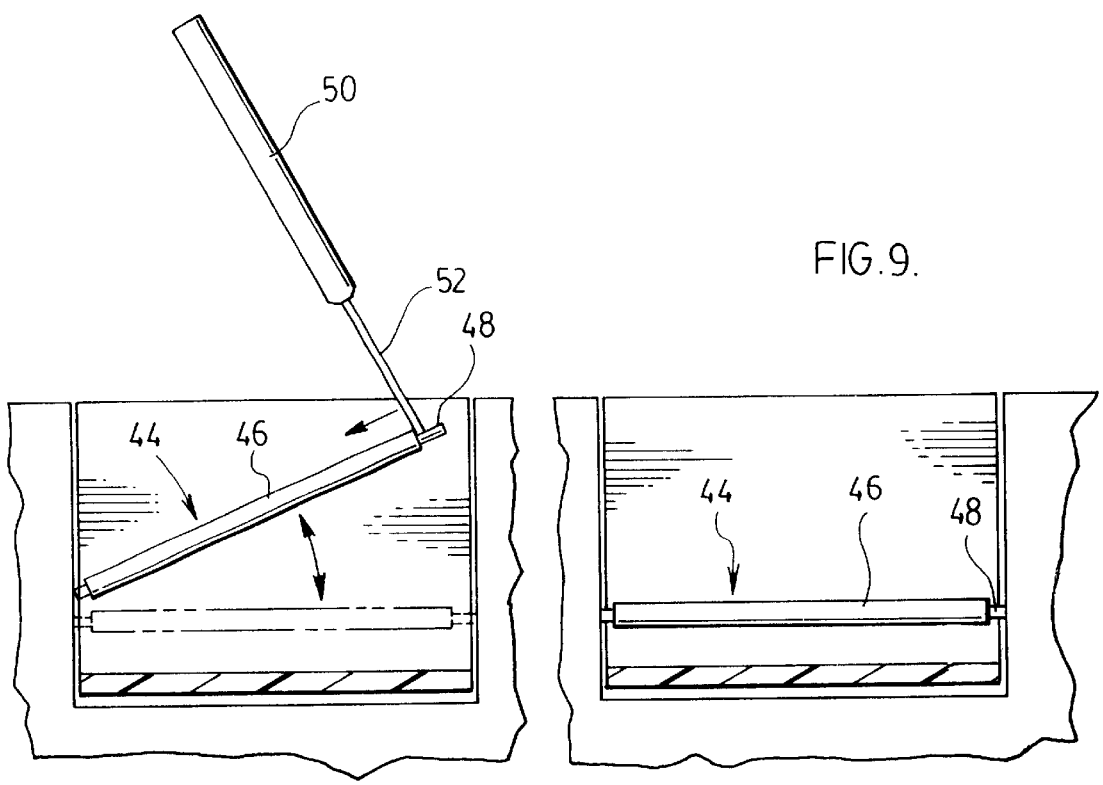
FIG. 9 is a side elevation view in cross-section illustrating the insertion of the lock into the biased latch.

As illustrated in FIG. 5, to remove the cover of the battery compartment 18, the free leg 34 is pushed toward the cover 22 by the fingertip of the user until the latching surface 36 is released from engagement with the underside of the recess 42. The user then lifts the cover 22 by lifting the biased latching means 28 until the biased latching means 28 is clear of the battery compartment 18. At that time the cover 22 may be removed by disengaging the tabs 24 from the openings 26.

A preferred embodiment of a lock 44 of the present invention is illustrated in FIGS. 6 through 9. The lock 44 functions to prevent the biased latching means 28 from being released and thereby being able to remove the cover 22 from the battery compartment 18. In a preferred embodiment the lock 44 operates to occupy the space between the free leg 34 and first leg 30 thereby preventing the free leg 34 from being moved to the release position toward the first leg 30 and cover 22 to prevent the latching surface 36 from being disengaged with the underside of the recess 42. The embodiment of the lock 44 illustrated in the figures is a metal rod 46 of a length approximating the length of the biased latching means 48. The diameter of the metal rod 46 is dimensioned to allow it to fit in the space between the free leg 34 and first leg 30. The metal rod 46 is preferably provided with biased extension pins 48 on either end to aid in retaining the lock 44 within the space between the two legs 38 and 34 as will be described hereinbelow.

To utilize the lock 44 of the present invention, the cover 22 is installed in the manner described above to close off the battery compartment 18. Once the cover 22 has been installed and the latching surface 36 engages the under surface of the recess 42, the lock 44 is placed into the space between the two legs 30 and 34. The lock 44 is pushed downwardly into the opening between the two legs 30 and 34 to a position where it will prevent the free leg 34 from being moved toward the first leg 30 preferably while at the same time not being so low in the space as to make it difficult to remove. As the lock 44 is being pushed downwardly the biased extension pins 48 are biased inwardly toward the center of the metal rod 46. This increases the engagement of the end of the pins 48 with the sides of the opening in which the biased latching means 28 sits. If desired, the lock 44 may be pushed into position by a suitable tool, called a removal tool 50 having a thin metal end 52, similar to a jeweller's screwdriver.

When it is desired to remove the lock 44 from the space between the two legs 30 and 34, the tool 50 is utilized to push one end of the metal rod downwardly. This pushing of the lock 44 downwardly causes the other end of the lock 44 to pivot upwardly until it can be removed from the space between the two legs 30 and 34. The cover 22 may then be removed and the batteries 20 changed in the usual manner. Once new batteries 20 are inserted into the compartment 18, the cover 22 is replaced and the lock 44 returned to the locking position.

The present invention provides a lock which is capable of securely blocking access to a compartment, preferably a compartment of a hand-held electronic device which contains a battery, memory card, or other peripheral device for the electronic device. While in the preferred embodiment the lock has been described for use with compartments of hand held electronic devices particularly battery compartments. The lock is useable with any compartment which uses a biased latch. The lock of the present invention is simple to use and functions effectively to prevent access to the compartment by preventing the biased latch from being unlatched. While a particular embodiment of the lock has been described herein, it will be appreciated by those skilled in the art that variations to this embodiment may be provided so long as a lock functions to prevent the removal of the cover of a battery or other compartment.

I claim:

1. A lock for locking a cover of a compartment of an electronic device to prevent opening of the cover, the cover being provided with a biased latch at one end which is moveable between a latch position for latching against a mating locking lip of the compartment of the electronic device and a release position to allow the cover to be removed from the compartment, the lock comprising a means for insertion into the biased latch once the cover has been latched to the compartment to prevent the biased latch from moving to an unlatching position.

2. A lock according to claim 1 wherein the biased latch is a U-shaped latch having a first leg attached to the cover and a second leg provided with a latching means and moveable toward the first leg to allow the cover to be latched and released and the means for insertion into the biased latch occupies the space between the two legs.

3. A lock according to claim 2 wherein the means for insertion into the biased latch is a metal rod dimensioned to allow it to fit in the space between the two legs and thereby prevent the biased latch from moving to an unlatching position.

4. A lock for locking a cover of a compartment of an electronic device to prevent opening of the cover, the cover being provided with a biased U-shaped latch at one end for latching against a mating lip of the compartment, the U-shaped latch having a first leg attached to an end of the cover and a second leg provided with the latching means, the second leg being movable toward the first leg to allow the cover to be latched and released, the lock comprising a means for insertion between the two legs of the U-shaped latch once the cover has been latched, to prevent the second leg from moving toward the first leg and thereby release the cover.

5. A lock according to claim 4 wherein the means for insertion into the biased latch is a metal rod dimensioned to allow it to fit in the space between the two legs and thereby prevent the biased latch from moving to an unlatching position.

* * * * *